Dec. 5, 1961     F. TAJAN     3,011,499
MULTI-PURPOSE CONTAINER
Filed June 25, 1958
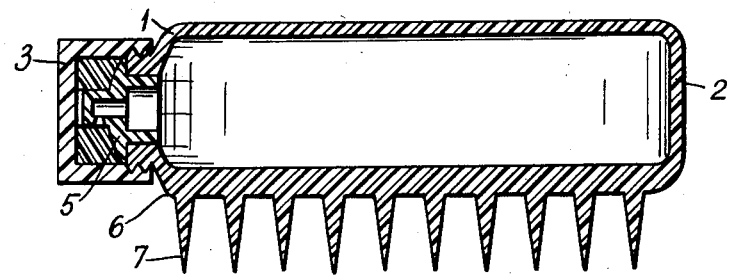
FIG.1
FIG.2     FIG.3
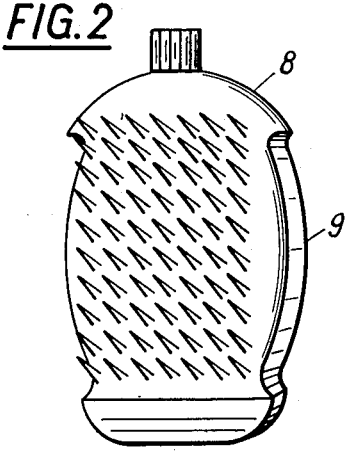 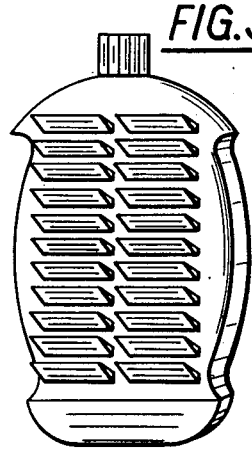
FIG.4     FIG.5     FIG.6
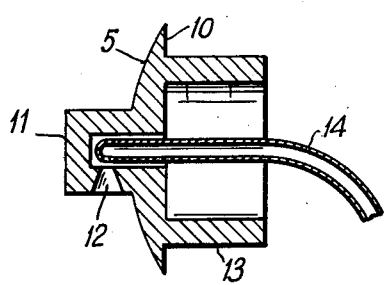  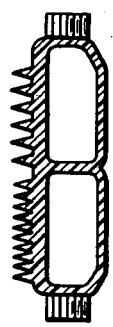
Inventor:
Francois TAJAN
by: J. Delattre Seguy
Attorney

United States Patent Office 3,011,499
Patented Dec. 5, 1961

3,011,499
MULTI-PURPOSE CONTAINER
François Tajan, 1 Place d'Astarac, Mirande, France
Filed June 25, 1958, Ser. No. 744,572
Claims priority, application France June 26, 1957
1 Claim. (Cl. 132—112)

This invention relates to a multi-purpose flexible container for liquid, semi-liquid or powdered products with means for the distribution of the product or products contained therein.

The object of the invention is to provide such a container made by pressure forming of plastic material and having the general form of a flask or of an assembly of flasks, the neck of which is fitted with a spraying device, at least one of its external surfaces being provided with a series of projections in view of permitting to rub in or spread over a surface the product or products stored in the container and sprayed therefrom by compressing its walls; in the case where the container is an assembly of flasks, the products stored in the individual flasks may be sprayed simultaneously or alternatively.

It is a further object of the invention to provide such a container in which the said series of projections is integral with at least one of the external surfaces of the container and obtained during the pressure moulding operation simultaneously with the corresponding wall of the container.

For other objects and for better understanding of the invention, reference may be had to the following detailed description taken in connection with the accompanying drawing in which:

FIG. 1 is an axial sectional view of a first embodiment.

FIG. 2 is an elevational view thereof on a reduced scale.

FIG. 3 is a view similar to that of FIG. 2 showing an amended form thereof.

FIG. 4 is an axial sectional view of one of its parts on a larger scale of an amended form thereof.

FIG. 5 is an elevational view of a second embodiment.

FIG. 6 is an axial sectional view of the second embodiment.

The container shown in FIG. 1 is a flat flask of flexible plastic material provided, on one of its external surfaces, with projections 7 and in the neck of which is fitted a spraying device 5. This sprayer may be closed, in a leak-proof manner, by means of the cap 3.

As shown in FIG. 2, the container 1 is provided with curved sides 9. This enables the device to be gripped easily and to be used as a brush, the projections acting as bristles. As shown in FIG. 3, the projections 7 may be in the form of a series of lamella when it is desired to use the device for massage purposes, or for the application of the product contained in the flask to any surface.

As shown in FIG. 4, the sprayer 5 may also be fitted with a small tube 14 when the container is intended for liquids. This sprayer is intended for the distribution of the product contained in the flask 1, the distribution being effected by means of manual pressure on its flexible sidewall.

In the embodiment shown in FIGS. 5 and 6, the container is provided with two compartments in which two different products may be stored.

The advantages of the container herein described are as follows:

(1) As shown in FIG. 2 (a perspective view of the brush resting on its flat base and fitted with its screw cap) the flask is specially shaped. It is reinforced 8 at top and bottom, for greater rigidity.

The body of the flask 9 is enlarged at the sides and thus forms the bellows of the sprayer.

This form enables the flask to be gripped easily. Manual pressure then expels the liquid, powder, or paste.

The base of the flask is flat 2 and this enables the article to be stood on said base without it being necessary to replace the cap to prevent the liquid running out.

The flask may contain any kind of liquid, powder, paste, or semi-liquid product, and constitutes, with its screw cap, a container which is completely leak-proof even for liquids as volatile as alcohol and ether or for hygroscopic materials in powder form.

(2) The comb is made up of the base 6 and the thick, conical teeth which stand out from one of the flat sides of the flask. These teeth may be formed in the same mould as for the flask or may be attached thereto.

The thick and therefore strong part of the teeth acts as a rake comb or fine comb according to the thickness of the teeth, their number, or the distance between themselves—this distance being variable according to requirements so as to be able to comb out hair, horse-hair or wool, for example, or all fibres whether badly entangled or not.

(3) The extremities of the teeth constitute the brush. These extremities are thin, flexible, and rounded, and form a brush of which the softness is determined by their fineness and their shape.

When distribution of a liquid or powder in hair, horse-hair, furs, long-wool fabric, or fabric of other fibres, whether long or short is desired, the comb may be used alone enabling entangled fibres to be re-arranged. It may then be used in conjunction with the sprayer, and will spread the liquid or powder uniformly over the fibres, right to their roots. This is because the fibres pass again and again past the teeth of the comb which thus stroke them, with a wavelike motion, over the whole of their length and over their whole surface. This result cannot be obtained with an ordinary brush which squeezes the fibres together so that they cannot be impregnated. Only the fibres near the surface receive the liquid or powder.

If the brush-comb is then used for the outer surface of the hair, in which case it acts as a brush, it enables excess powder to be brushed away or, in the case of a liquid, to effect a more even distribution of the substance over the hair, fur or other fibres and, at the same time, to impart a gloss to the fibres treated.

When its is desired to distribute pastes, pomades, or other semi-liquid products, the flask may be fitted with transverse lamella in place of the teeth, as shown in FIG. 3. These lamella may be of flexible plastic or any other material and may be divided up to give greater flexibility. These lamella, rigid near their base and pliable towards their extremities, bend to and fro with each brushing movement and, in this way, spread the product over any required surface. They act in much the same way as a spatula enabling a surface to be impregnated or coated with a substance. Similarly a paste or pomade may be distributed or a rough or irregular surface may be filled or made level.

As in the case of the teeth of the comb, these lamella may form an integral part of the brush, or may be made interchangeable by being mounted in grooves or by any other appropriate mounting method.

(4) The sprayer-diffuser is shown in FIG. 4, which is a vertical section of the sleeve through the centre of the diffuser. It comprises a specifically designed sleeve in a rigid plastic or in any other material. The part marked 13 in the figure is introduced into the neck of the flask as far as the shoulder 10, the flask having been previously filled with liquid or powder.

The part of the sleeve marked 11 in the figure, which is cylindrical in cross section, is pierced with a small aperture at point 12, the size of the aperture being suited to the material which is to be ejected. This aperture is larger at the outer surface of the sleeve than at the inner surface and is thus conical. This form of aperture ensures that the liquid or powder is very effectively divided up on ejection. Pressure on the flexible outer surface of the flask results in a forceful ejection of the substance in the form of a cone of dispersion, ensuring even and homogenous distribution.

In the case of a liquid of low viscosity, a small tube, FIG. 4, may be added. This tube, bent in the form of a curve 14, may be of plastic material or of non-corrodible metal. The tube is open at its lower end, which, to ensure complete empting of the flask, must rest on the side of the flask which carries the projections. It is closed at its upper end and this must fit into the part of the sleeve marked 11.

The side of the tube is pierced with a very fine aperture which must line up with the aperture in the sleeve. The liquid is ejected from this aperture when the flask is compressed. When the flask is released air enters at the same aperture.

The size of the aperture in the sleeve may be suited to the nature of the product which is to be projected or distributed.

In the case of a thick or viscous liquid which flows slowly and thus does not easily allow air to re-enter the flask on relaxation of the pressure, a small additional aperture may be made. This aperture must be closed with the index finger during pressure on the walls of the flask, and uncovered when the flask is released.

Between the diffusing sleeve 5 and the screw cap 3, and lodged in the latter, is a washer of plastic material or of any other flexible material. The head of the sleeve passes into the central hole of the washer.

On tightening the screw cap this washer is compressed and complete freedom from leakage of the contents of the flask is thus ensured.

The above description of the various parts of the invention, as well as the enumeration of the qualities of each part, gives an idea of the large number of ways in which the invention may be used.

In the first place, the whole device, and the flask in particular, is unbreakable, and this is a particular advantage in the case of corrosive, messy, odorous, or inflammable liquids.

Perfect freedom from leaks is ensured. Liquids may thus be stored without fear of unfortunate or even dangerous spilling. Powders are fully protected from the effects of humidity.

The flask, duly filled and with the cap secure, may be used, as required, as a brush-comb.

The brush may be easily cleaned and may be soaked, even when filled, in a bath of disinfectant. It may thus be used for all personal, household, veterinary, or other purposes.

With lamella in place of the teeth, pomade or any other ingredient may be spread on the human body or on animals with a massaging action which facilitates penetration of the fluid. It enables pastes to be spread on widely differing surfaces and rough or dented surfaces may be filled and levelled, as with a spatula.

The present invention, and this is one of its principal advantages, makes it possible for one person to treat an animal where it is desired that a powder or fluid penetrate through the fur, hair, or wool to make contact with the skin of the animal—the powder or fluid being an insecticide, an antiseptic or a skin medicament. One hand only is required to hold both the instrument used to apply the substance as well as a store of the substance itself, and there is no risk of breakage. Light pressure with the palm of the hand is all that is necessary to eject a quantity of the substance and the simultaneous action of the brush spreads it out in a regular and systematic manner. The other hand, which remains unencumbered, is free to manage the animal which may act in a lively manner, especially if the treatment consists in the application of vesicants, burning liquids, or irritating or counter-irritant liniments.

The value of the invention may be enhanced by the joining together of two flasks as shown in FIG. 5. The flasks may be joined by being formed in a common mould or by welding, screwing, or by any other process. This assembly makes it possible to have two containers, each having its own sprayer for liquid or powder thus permitting a combination of two liquids or one liquid and one powder, or two powders.

In this case, the combs may be different on each of the two flasks, a rough comb on one and a fine comb on the other. They may also be made fixed or interchangeable.

This embodiment of the invention puts at the disposition of the tourist or traveller an object which reduces the articles required for his toilet to the absolute minimum.

A further advantage of the invention is that of ensuring great economy in the use of the fluid or powder. No more of the product than is required for a given purpose is used. Accidental spilling, such as occurs with ordinary tins of powder or with liquids contained in ordinary flasks, is avoided.

The selling price of the device herein described is very low. This is due, firstly, to the fact that its manufacture requires few man-hours, secondly because it replaces a large number of other objects, and finally because of the many uses to which it may be put in many different spheres.

It is evident that, without departing from the central idea of the invention, changes may be made to the materials from which it is constructed as well as to the form of the various parts which have just been described. These descriptions are given as a general indication only, and changes may be made to, in particular the ejection aperture on the sleeve, the shape of the flask in as much as it forms the bellows of the sprayer, the form, number and qualities of the lamella and the teeth of the comb which may be of plastic or of any other material, fixed or interchangeable. It is also possible to join together several flasks, each with its own sprayer, for various different requirements.

What I claim is:

A flexible combined combing and liquid-spraying apparatus for the treatment of hair and wool-carrying animals, comprising: a flat elongated yielding body of flexible plastic material; a chamber enclosed in said body and forming a container for the liquid to be sprayed; said body having two parallel flat surfaces and two curved peripheral side surfaces connected respectively to said flat surfaces at opposite edges of the latter; lateral recesses in each of said peripheral surfaces; said body being adapted to be grasped by the hand between the recesses in the peripheral surfaces and across one of said flat surfaces; a nozzle integral with said body, projecting beyond and perpendicularly to one of said peripheral side surfaces; a hollowed-out sprayer fitted tightly onto said nozzle and coaxial with the latter; a lateral spraying port provided in said sprayer and opening outwardly in a direction perpendicular to said flat surfaces; detachable means for covering said sprayer and said nozzle; and a plurality of outwardly tapering tooth-shaped projections raised on the other one of said flat surfaces, the outer ends of said projections being pointed and softer than their inner ends.

References Cited in the file of this patent

UNITED STATES PATENTS

| | | |
|---|---|---|
| 258,248 | Noyes et al. | May 23, 1882 |
| 1,375,681 | Dennin | Apr. 26, 1921 |

(References on following page)

UNITED STATES PATENTS

| | | |
|---|---|---|
| 1,518,388 | Cameron | Dec. 9, 1924 |
| 1,714,556 | Grosser | May 28, 1929 |
| 2,379,330 | Willensky | June 26, 1945 |
| 2,578,864 | Tupper | Dec. 18, 1951 |
| 2,617,431 | Gaspari | Nov. 11, 1952 |
| 2,660,183 | Gruring | Nov. 14, 1953 |
| 2,738,107 | Graham | Mar. 13, 1956 |
| 2,792,007 | Parmer | May 14, 1957 |
| 2,828,500 | Peacock | Apr. 1, 1958 |
| 2,851,713 | Tupper | Sept. 16, 1958 |
| 2,876,935 | Lindberg | Mar. 10, 1959 |
| 2,887,709 | Carolanza | May 26, 1959 |
| 2,944,273 | Harris | July 12, 1960 |